(12) United States Patent
Nachum

(10) Patent No.: US 9,736,051 B2
(45) Date of Patent: Aug. 15, 2017

(54) SMARTAP ARRANGEMENT AND METHODS THEREOF

(71) Applicant: Ixia, Calabasas, CA (US)

(72) Inventor: Youval Nachum, Santa Clara, CA (US)

(73) Assignee: Ixia, Calabasas, CA (US)

( * ) Notice: Subject to any disclaimer, the term of this patent is extended or adjusted under 35 U.S.C. 154(b) by 0 days.

(21) Appl. No.: 14/266,665

(22) Filed: Apr. 30, 2014

(65) Prior Publication Data

US 2015/0319030 A1    Nov. 5, 2015

(51) Int. Cl.
*H04L 12/701* (2013.01)
*H04L 12/26* (2006.01)
*H04L 12/24* (2006.01)

(52) U.S. Cl.
CPC .............. *H04L 43/12* (2013.01); *H04L 12/26* (2013.01); *H04L 41/02* (2013.01); *H04L 41/26* (2013.01); *H04L 43/02* (2013.01); *H04L 43/106* (2013.01)

(58) Field of Classification Search
CPC ...................................................... H04L 12/26
USPC ........................................................ 370/250
See application file for complete search history.

(56) References Cited

U.S. PATENT DOCUMENTS

| | | |
|---|---|---|
| 7,277,637 B2 | 10/2007 | Jette et al. |
| 7,295,119 B2 | 11/2007 | Rappaport et al. |
| 7,352,705 B1 | 4/2008 | Adhikari et al. |
| 7,454,140 B2 | 11/2008 | Jett et al. |
| 7,496,815 B2 | 2/2009 | Bhaumik et al. |
| 7,516,033 B2 | 4/2009 | Smith et al. |
| 7,660,409 B1 | 2/2010 | Czerwiec et al. |
| 7,706,264 B2 | 4/2010 | Lai et al. |
| 7,756,418 B2 | 7/2010 | Ofalt et al. |
| 7,773,511 B2 | 8/2010 | Rambo et al. |
| 7,773,982 B2 | 8/2010 | Bishop et al. |
| 7,808,247 B1 | 10/2010 | Lo |
| 7,835,293 B2 | 11/2010 | Cidon et al. |
| 7,849,177 B2 | 12/2010 | Uhlik |
| 7,933,518 B2 | 4/2011 | Li et al. |
| 7,940,676 B2 | 5/2011 | Griffin et al. |

(Continued)

FOREIGN PATENT DOCUMENTS

| | | |
|---|---|---|
| JP | 2005-129981 A | 5/2005 |
| KR | 10-2008-0073006 A | 8/2008 |

(Continued)

OTHER PUBLICATIONS

"Network Taps," http://www.netoptics.com/products/network-taps, pp. 1-2 (Apr. 26, 2013).

(Continued)

*Primary Examiner* — Omar Ghowrwal
*Assistant Examiner* — Angel Brockman
(74) *Attorney, Agent, or Firm* — Jenkins, Wilson, Taylor & Hunt, P.A.

(57) ABSTRACT

Methods for enabling monitoring a network with a monitoring tool are disclosed. The method includes receiving data packets and adding metadata to the data packets, thereby forming metadata-enhanced data packets. The method also includes forwarding the metadata-enhanced data packets along a path toward the monitoring tool, wherein the metadata pertains to data employed by the monitoring tool to perform network monitoring tasks. Arrangements for performing the same are also disclosed.

20 Claims, 5 Drawing Sheets

(56) References Cited

U.S. PATENT DOCUMENTS

| | | | |
|---|---|---|---|
| 7,965,195 | B2 | 6/2011 | Deaver, Sr. et al. |
| 8,073,943 | B2 | 12/2011 | Monk et al. |
| 8,077,026 | B2 | 12/2011 | Jobe et al. |
| 8,077,049 | B2 | 12/2011 | Yaney et al. |
| 8,081,578 | B2 | 12/2011 | Adam et al. |
| 8,145,447 | B2 | 3/2012 | Zellner et al. |
| 8,156,098 | B1 | 4/2012 | Landsman et al. |
| 8,165,572 | B1 | 4/2012 | Kirchhoff et al. |
| 8,189,468 | B2 | 5/2012 | Bugenhagen |
| 8,316,005 | B2 | 11/2012 | Moore |
| 8,363,557 | B2 | 1/2013 | Adam et al. |
| 8,515,015 | B2 | 8/2013 | Maffre et al. |
| 8,700,738 | B2 | 4/2014 | Moore et al. |
| 9,166,992 | B1* | 10/2015 | Stickle ............... H04L 63/1408 |
| 9,178,768 | B2 | 11/2015 | Adam et al. |
| 2002/0145979 | A1 | 10/2002 | Baj |
| 2003/0093513 | A1 | 5/2003 | Hicks et al. |
| 2004/0151127 | A1 | 8/2004 | Chong |
| 2005/0201321 | A1* | 9/2005 | Sinnarajah ............ H04L 12/189 370/328 |
| 2006/0114920 | A1 | 6/2006 | Jung et al. |
| 2006/0200711 | A1* | 9/2006 | Schondelmayer .. H04L 43/0847 714/712 |
| 2006/0268718 | A1* | 11/2006 | Jones .................. H04L 43/0852 370/235 |
| 2007/0011145 | A1 | 1/2007 | Snyder |
| 2007/0011725 | A1 | 1/2007 | Sahay et al. |
| 2007/0147354 | A1 | 6/2007 | He |
| 2007/0177615 | A1 | 8/2007 | Miliefsky |
| 2007/0223512 | A1 | 9/2007 | Cooper et al. |
| 2008/0002675 | A1 | 1/2008 | Li et al. |
| 2008/0031243 | A1* | 2/2008 | Gershinsky ......... H04L 12/1859 370/390 |
| 2008/0031425 | A1 | 2/2008 | Glynn et al. |
| 2008/0102809 | A1 | 5/2008 | Beyer |
| 2008/0136607 | A1 | 6/2008 | Ratcliff et al. |
| 2008/0184260 | A1 | 7/2008 | Grayson |
| 2008/0195461 | A1 | 8/2008 | Li et al. |
| 2009/0046636 | A1 | 2/2009 | Kwak |
| 2009/0060495 | A1 | 3/2009 | Wurst et al. |
| 2009/0116398 | A1* | 5/2009 | Shi .......................... H04L 47/10 370/252 |
| 2009/0129557 | A1 | 5/2009 | Carter et al. |
| 2009/0243517 | A1 | 10/2009 | Verfuerth et al. |
| 2009/0245118 | A1 | 10/2009 | McCormick |
| 2009/0268713 | A1 | 10/2009 | Ottur et al. |
| 2009/0279433 | A1* | 11/2009 | Briscoe ............... H04L 12/2602 370/235 |
| 2009/0285091 | A1* | 11/2009 | Hiscock ................. H04L 12/24 370/230 |
| 2009/0290513 | A1 | 11/2009 | Swan |
| 2010/0027426 | A1* | 2/2010 | Nair et al. ..................... 370/238 |
| 2010/0172246 | A1 | 7/2010 | Adam et al. |
| 2010/0172251 | A1* | 7/2010 | Adam .................... H04L 41/12 370/252 |
| 2010/0266106 | A1 | 10/2010 | Adam et al. |
| 2012/0300628 | A1* | 11/2012 | Prescott ................. H04L 41/14 370/232 |

FOREIGN PATENT DOCUMENTS

| | | |
|---|---|---|
| WO | WO 2010/080926 A1 | 7/2010 |
| WO | WO 2010/080927 A2 | 7/2010 |
| WO | WO 2010/080930 A2 | 7/2010 |

OTHER PUBLICATIONS

Notice of Allowance and Fee(s) Due for U.S. Appl. No. 12/406,912 (Jun. 24, 2015).
Non-Final Office Action for U.S. Appl. No. 12/406,912 (Mar. 4, 2015).
Applicant-Initiated Interview Summary for U.S. Appl. No. 12/406,912 (Jan. 12, 2015).
Advisory Action and Examiner-Initiated Interview Summary for U.S. Appl. No. 12/406,912 (Dec. 17, 2014).
Final Office Action for U.S. Appl. No. 12/406,912 (Oct. 8, 2014).
Non-Final Office Action for U.S. Appl. No. 12/406,912 (Apr. 28, 2014).
Advisory Action Before the Filing an Appeal Brief for U.S. Appl. No. 12/406,912 (Dec. 31, 2013).
Applicant-Initiated Interview Summary for U.S. Appl. No. 12/406,912 (Dec. 27, 2013).
Final Office Action for U.S. Appl. No. 12/406,912 (Sep. 17, 2013).
Non-Final Office Action for U.S. Appl. No. 12/406,912 (Apr. 29, 2013).
Applicant-Initiated Interview Summary for U.S. Appl. No. 12/406,912 (Jan. 17, 2013).
Final Official Action for U.S. Appl. No. 12/406,912 (Oct. 15, 2012).
Notice of Allowance and Fee(s) Due for U.S. Appl. No. 12/475,451 (Oct. 4, 2012).
Notice of Allowance and Fee(s) Due for U.S. Appl. No. 12/475,451 (Jun. 8, 2012).
Official Action for U.S. Appl. No. 12/406,912 (May 24, 2012).
Official Action for U.S. Appl. No. 12/475,451 (Nov. 23, 2011).
Notice of Allowance and Fee(s) Due for U.S. Appl. No. 12/395,657 (Aug. 17, 2011).
Official Action for U.S. Appl. No. 12/475,451 (Apr. 15, 2011).
Official Action for U.S. Appl. No. 12/395,657 (Apr. 14, 2011).
Notification of Transmittal of the International Search Report and the Written Opinion of the International Searching Authority, or the Declaration for International Application No. PCT/US2010/020394 (Aug. 16, 2010).
Notification of Transmittal of the International Search Report and the Written Opinion of the International Searching Authority, or the Declaration for International Application No. PCT/US2010/020391 (Aug. 13, 2010).
Notification of Transmittal of the International Search Report and the Written Opinion of the International Searching Authority, or the Declaration for International Application No. PCT/US2010/020390 (Aug. 13, 2010).
"Series P: Telephone Transmission Quality, Telephone Installations, Local Line Networks; Methods for Ovjective and Subjective Assessment of Quality; Perceptual Evaluation of Speech Quality (PESQ): An Objective Method for End-to-End Speech Quality Assessment of Narrow-Band Telephone Networks and Speech Codecs," ITU-T P3862 (Feb. 2001).

* cited by examiner (PRIOR ARTS)

SMARTAP ARRANGEMENT AND METHODS THEREOF

BACKGROUND OF THE INVENTION

Maintaining a safe network environment can be a challenge in today's ever-growing virtual environment. To ensure that the network is fully functional and secured, companies may implement monitoring and filtering arrangements. Monitoring and filtering may help ensure reliable operation while mitigating potential malicious activities.

To facilitate discussion, FIG. 1 shows a simple legacy network environment with a tap arrangement. A network environment 100 may include two networks (102 and 104) connected via an interconnected network 106. Consider the situation wherein, for example, a user connected to network 102 may be sending an email to a user on network 104. The email, in the form of a set of network packets, may be routed through the network via a plurality of routers (108, 110, 112, 114, 116, and 118) and/or switches (120 and 122).

In a legacy network environment, network elements (such as routers and switches) may route or switch network traffic packets through the network based on their IP addresses and MAC (Media Access Controller) addresses. For example, a data packet being transmitted may be sent to router 108. Upon receiving the data packet, router 108 may employ the IP addresses in the packet header to determine the source and destination addresses for the network traffic packet and forward the network traffic packet to the next network element ("hop") based on the IP addresses. Since routers tend to be layer 3 devices, router 108 may modify the MAC address before sending the data packet to the next hop (e.g., network element). In an example, router 108 may change the MAC address by modifying the source MAC address to its own MAC address and the destination MAC address to the MAC address of the next router (such as router 110) in the path. Unlike routers, switches are usually layer 2 devices that do not tend to modify the source and destination MAC addresses of the data packet. In an example, if switch 120 encounters the data packet, the data packet may be forwarded, based on the current MAC addresses, without being modified.

To monitor network traffic, taps (128, 130, 132, and 134) may be employed. The network traffic being monitored may be copied and redirected to monitoring tools (142, 144, and 146) via a network packet broker 140. In a typical network environment, each tap is associated with a receive port of a network packet broker. For example, receive port 1 of network packet broker 140 is associated with tap 128, receive port 2 is associated with tap 130, receive port 3 is associated with tap 134 and receive port 4 is associated with tap 132. Based on this association, network packet broker 140 may be able to deduce that the data packet being received at port 1 have been forwarded by tap 128.

The monitoring tools may access relevant, data in the duplicate network packet and depending on the data obtained from the duplicate network packet, the monitoring tools may perform various tasks, such as maintaining the stability of the network, preventing malicious attacks, etc. For example, the location of the sender and the receiver of the data packet may be determined based on the source and destination IP addresses. Also, the source and destination routers may be determined based on the MAC addresses. Further, the tap that duplicated the data packet may also be determined based on the receive port identifier since each tap is associated with a specific port of network packet broker 140. In addition, network packet broker may add a time stamp to the duplicated network packet before forwarding the data packet to the monitoring tools. With the time stamp, the monitoring tools may be provided with a time approximation of when the tapping may have occurred.

The example as shown in FIG. 1 is an example of a network environment in which each tap is physically wired to a network device within the network. However, in recent years, the popularity of the Internet has given rise to new network architectures that may not always entail physical connections. Instead of typical network elements hardwired to one another, the new network architectures may include a partial or full implementation of a virtual network, in a virtual environment, such as cloud-computing network or mobile network, network data packets may be flowing through abstract representations of the actual physical hardware.

In a virtual environment, especially one that is heavily dependent upon layer 2 network elements, monitoring network traffic may be challenging. First, since most layer 2 network elements, such as switches, are configured to forward data packets without modifying the MAC addresses, the source and destination MAC addresses no longer provide the required data necessary to track the previous network element and destination element of the "hop". Thus, if a problem is identified in the packet data, the monitoring tools may not have the required data necessary to perform analysis and determine the source of the problem.

Second, the IP address, especially the source IP address no longer refers to a physical location. In the legacy hardwired network environment, the IP address may refer to a stationary network element. However, given that IP address may now be associated with network devices (such as mobile devices) that are not necessarily stationary, the IP address may no loaner refers to the location of the mobile device. For example, a virtual machine or a tablet may be associated with a first IP address. However, even if the tablet roams to a location fifty miles away from the location where the first IP address is initially assigned to the tablet, the tablet's IP address would still stay the same while roaming to this distant location. This is necessary for session continuity and is well-known. Thus, determining the source of the problem may be a challenge for the monitoring tools since an IP address is no longer a reliable indicator of physical location.

Another challenge is that tap devices may no longer be directly connected to a network packet broker in a virtual environment. As a result, upon receiving a network packet, the network packet broker can no longer determine the identity of the origin of the tap device since the tap device is no longer physically associated with a particular port of the network packet broker.

Similar to the legacy hardwired network environment, the network packet broker may provide a time stamp for the incoming network packets. However, the time stamp is the time at which the network packet broker receives the network packet. The time stamp is not the actual time that the tap duplicates the network packet. In today network environment, wherein time accuracy may be required in order to determine when and where the problem may have occurred or to ensure accuracy in financial transaction for example, time estimate may no longer be sufficient in enabling a timely response.

Accordingly, arrangements and methods for performing network monitoring on a virtual environment are desirable.

SUMMARY OF SOME EMBODIMENTS OF THE INVENTION

The invention relates, in an embodiment, to an arrangement for enabling monitoring a network with a monitoring tool, wherein the monitoring tool performing network monitoring tasks. The arrangement includes a first port for receiving data packets. The arrangement also includes logic communicatively coupled to the first port. The logic adds first metadata to a first data packet of the data packets, thereby forming a first metadata-enhanced data packet. The arrangement further includes a second port for forwarding the first metadata enhanced data packet along a path toward the monitoring tool, wherein the metadata pertains to data employed by the monitoring tool to perform the network monitoring tasks.

In another embodiment, the invention relates to a method for enabling monitoring a network with a monitoring tool, wherein the monitoring tool performing network monitoring tasks. The method includes receiving data packets. The method also includes adding first metadata to a first data packet of the data packets, thereby forming a first metadata-enhanced data packet. The method further includes forwarding the first metadata-enhanced data packet along a path toward the monitoring tool, wherein the metadata pertains to data employed by the monitoring tool to perform the network monitoring tasks.

BRIEF DESCRIPTION OF THE SEVERAL VIEWS OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
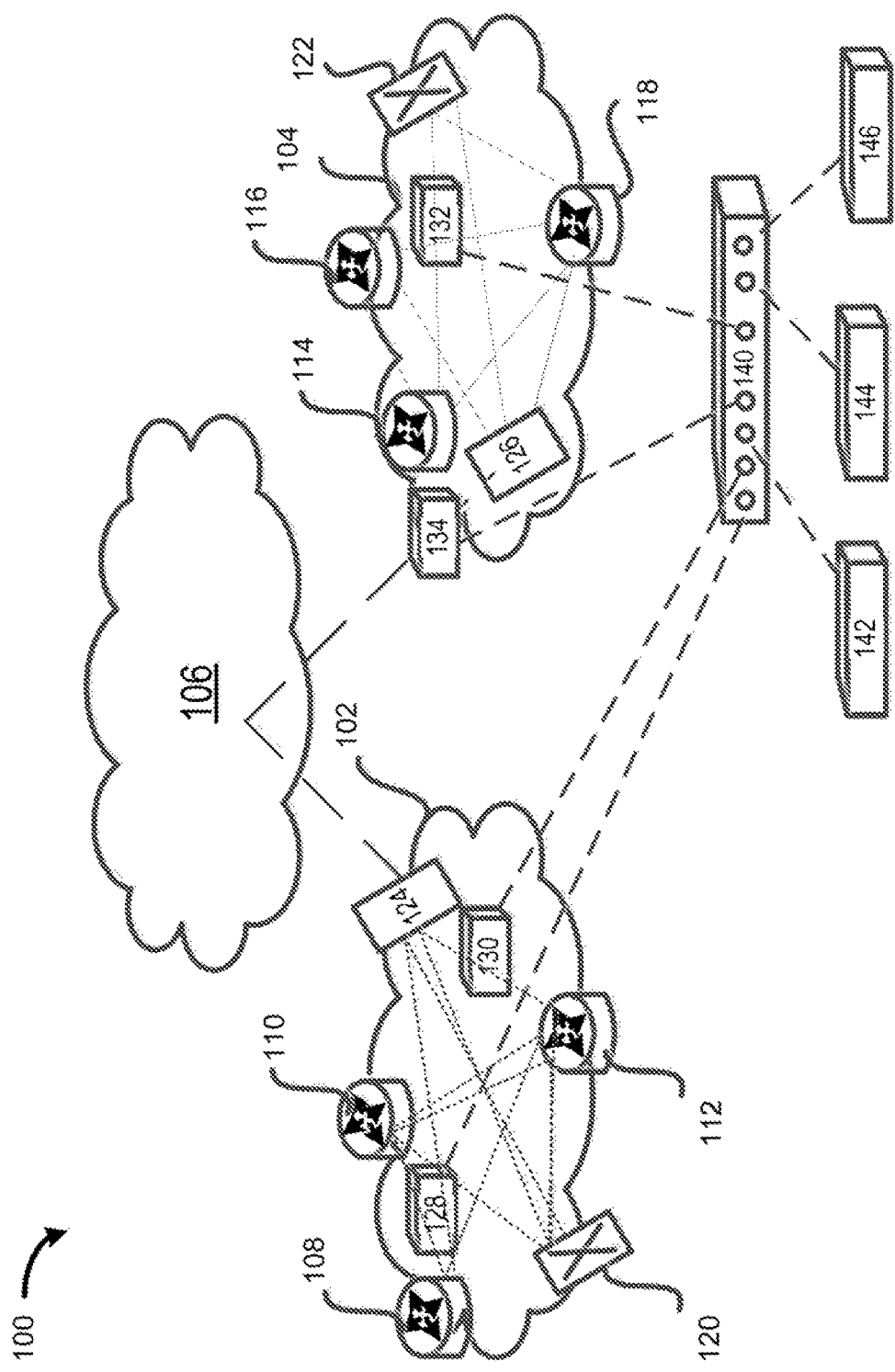
FIG. 1 shows a simple legacy network environment with a tap arrangement.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

The invention is described with reference to specific architectures and protocols. Those skilled in the art will recognize that the description serves to illustrate and to provide examples of different modes of practicing the invention. The description is not meant to be limiting. For example, the invention is applicable to both wire and optical technologies. In addition, even though the invention may be described using an inline tap example, the invention is not limited to an inline device and may include programmable logic for performing inline and/or span functions.

In accordance with embodiments of the present invention, arrangements and methods are provided for monitoring network traffic flowing within a virtual environment. As the term in employed herein, a virtual environment may be a virtual network such as for example a cloud computing network). Alternatively or additionally, the virtual environment may be a mobile network. As discussed herein, a mobile network refers to, but is not limited to, a network environment in which the IP address is not modified even if the device associated with the IP address is mobile (such as roaming from one base station to another). Embodiments of the invention include a configurable tapping arrangement. Embodiments of the invention also include a logic arrangement for managing the flow of network traffic directed toward the monitoring tools.

In one aspect of the invention, the inventors herein realized that tap-generated metadata may be added to network data packets to enable monitoring tools to perform its network monitoring tasks. Network monitoring tasks include for example monitoring-related security and malware prevention tasks. In an embodiment of the invention, a SmarTap arrangement is provided wherein the SmarTap arrangement is configured for creating tap-generated metadata that encapsulate information for network analysis. With the tap-generated metadata, relevant data required by the monitoring tools to ensure a secure and safe network environment may be provided.

The tap-generated metadata, in an embodiment, may be configured based on predefined requirements. In an example, a monitoring tool may predefine the tap-generated metadata criteria required for its monitoring function. Based on these requirements, the size of the tap-generated metadata may vary depending upon the number of attributes and the size of the attribute fields. Each attribute, in an embodiment, may vary based on type, length and value. Examples of attributes that may be included in the tap-generated metadata may include time stamp, statistics, flow ID, location, and the like. In an embodiment, the predefined requirements may be imposed by the monitoring tools.

In an embodiment, the data packet that is forwarded to the monitoring tool may include a truncated version of the data packet. Consider the situation, wherein for example, a monitoring tool does not require access to the entire data packet to perform its monitoring tasks. The SmarTap may be configured to only send a truncated data packet (e.g., the first 64 bytes) to the monitoring tool. Since information about the network may be included in the tap-generated metadata, the truncated data packet may facilitate data monitoring while reducing the strain on the network resource (such as the network bandwidth). The size of the truncated data packet may be preconfigured.

In the prior art, the data packet being forwarded to a monitoring tool may be a copied version of the original data packet. In an embodiment, the data packet being forwarded to the monitoring tool may be the original data packet with the attached tap-generated metadata. In other words, the tap-generated metadata may be added to the original data packet without modifying the original content of the data packet in one embodiment. In another embodiment, the tap-generated metadata may be added to the content portion of the packet.

The data packet may then be transported to the monitoring tool before being routed to its destination. If the tap-generated metadata is not incorporated as part of the data packet content (as is done in a preferred embodiment), the monitoring tool may not have to decapsulate the packet to perform deep inspection in order to retrieve the required information needed to perform its analyzing tasks, such as performing analyze the condition of the network. Since deep inspection may not be required, the network resources that may be required to perform network analysis may be substantially reduced.

In an embodiment, the SmarTap arrangement may be configured to perform filtering. In an example, the SmarTap arrangement may be configured to only forward data packets to the monitoring tools if certain specific criteria are met. Hence, the filtering functionality may minimize the influx of data that are not relevant to the monitoring tools.

In an embodiment, the SmarTap arrangement may be configured for packet sampling. Consider the situation wherein, for example, the user wants to determine the packet rate. Instead of forwarding all network traffic, the SmarTap arrangement may be configured to only forward a percentage (such as 50 percent) of the network traffic to the requested monitoring tool. Based on the packet sample, a rate may be calculated for the entire network traffic. By employing packet sampling, the demand upon the network bandwidth may be substantially reduced.

In an embodiment, the SmarTap arrangement may be configured for performing tapping based on a predefined threshold. For example, the user may configure the SmarTap arrangement to forward and/or duplicate the network packet if a threshold has been met.

Intrusion detection system may monitor the network to detect if specific packet type exceeds the expected rate at a "normal" network behavior. When the rate of a given type of packet exceeds a predefined threshold, the TAP may redirect or duplicate the packets to the intrusion detection system. For example, if the number of TCP SYN packets exceeds a threshold, TCP SYN packets may be enhanced with metadata and redirected or duplicated to the intrusion detection system to determine if a denial-of-service attack is underway.

In an embodiment the SmarTap arrangement is configured to be compatible within a legacy hardwire environment and/or a virtual environment. In other words, the SmarTap arrangement may include functionalities that may enable the SmarTap arrangement to provide monitoring capabilities within a legacy hardwired network environment while at the same providing monitoring capability within a virtual environment.

In an embodiment, the SmarTap arrangement may be implemented as a separate tap arrangement. In another embodiment, the SmarTap arrangement may be configured as a software implementation, such as within a network packet broker.

In accordance of an embodiment of the invention, the arrangement may include a first port for receiving data packets, logic for adding tap-generated metadata to data packets to create metadata-enhanced data packets and a second port for sending the metadata-enhanced data packets along a path to a monitoring tool to enable the monitoring tool to perform network monitoring using at least the metadata in the metadata-enhanced data packets. In an example, the arrangement represents a tap configured with the above-mentioned capability. In another example, the arrangement represents a network packet broker configured with the above-mentioned capability.

In another embodiment, the invention includes a method for enabling monitoring a network with a monitoring tool. The method includes receiving data packets and adding metadata to the data packets to form metadata-enhanced data packets. The method includes forwarding metadata-enhanced data packets along a path toward the monitoring tool, wherein the metadata pertains to data employed by the monitoring tool to perform the network monitoring tasks.

The features and advantages of the present invention may be better understood with reference to the figures and discussions that follow.

Figure 2:
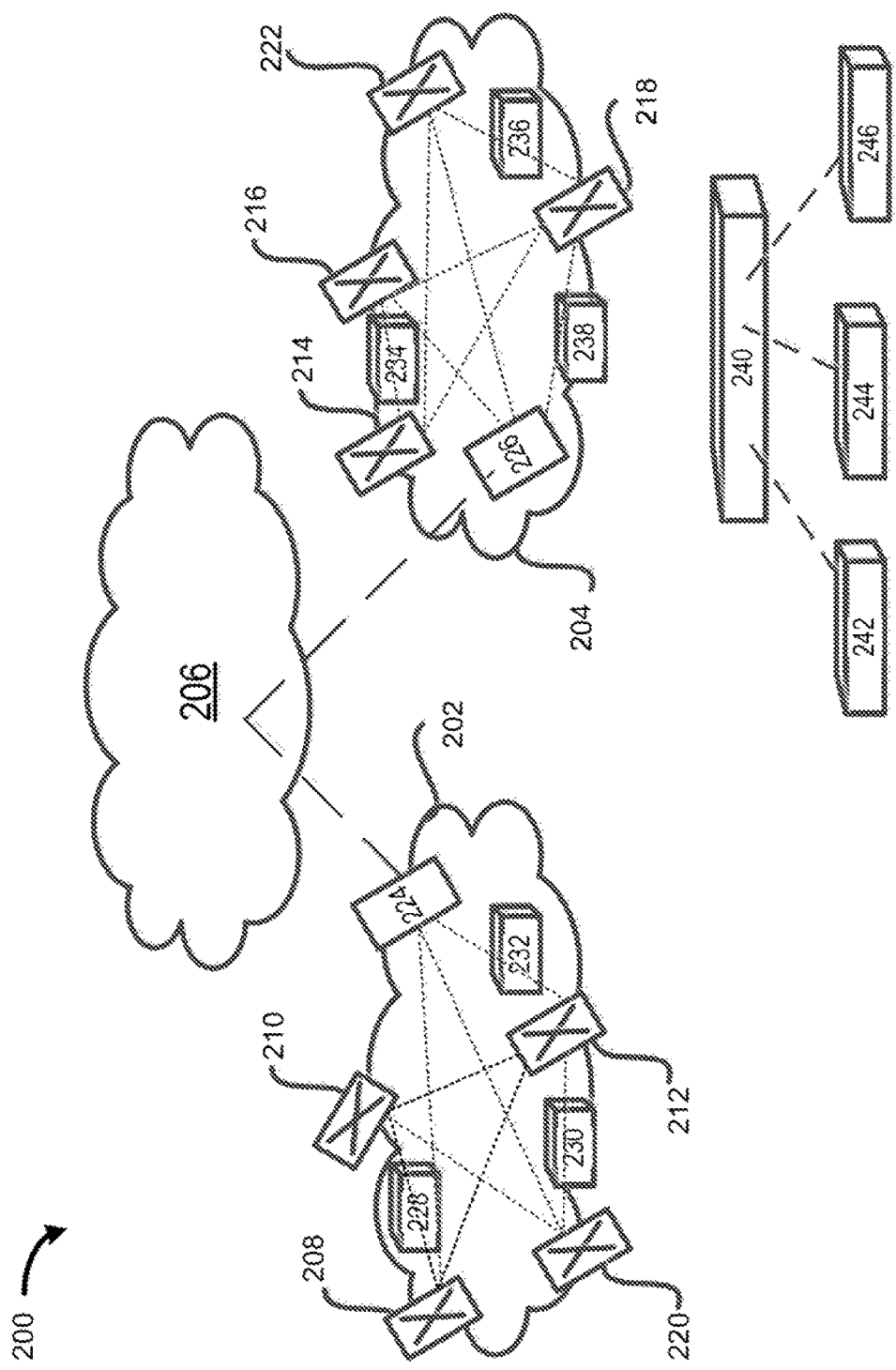
FIG. 2 shows, in an embodiment of the invention, an example of a distributed monitoring network environment.

FIG. 2 shows, in an embodiment of the invention, an example of as distributed monitoring network environment 200. Distributed monitoring network environment 200 may include two or more networks (202 and 204) connected via an interconnected network 206. Network traffic flowing through the networks may be routed by a plurality of network elements (such as switches 208, 210, 212, 214, 216, 218, 220, and 222) and a set of network access elements (224 and 226).

In an embodiment, a set of SmarTap arrangements (228, 230, 232, 234, 236, and 238) may be employed to monitor the network traffic. Each SmarTap arrangement may include a logic arrangement for analyzing, duplicating, and/or forwarding data packets. In an embodiment, each SmarTap arrangement may include logic (using software and/or hardware) for creating and attaching tap-generated metadata to the selected data packet to form metadata-enhanced data packet. Consider the situation, wherein, for example, SmarTap arrangement 228 may be positioned between network elements 208 and 210. In an embodiment, upon intercepting the data packet, SmarTap arrangement 228 may add tap-generated metadata to the data packet. The tap-generated metadata may include attributes that provide relevant data that at least one of the monitoring tools (242, 244, and 246) may utilize to perform its monitoring tasks, such as network analysis.

Figure 3:
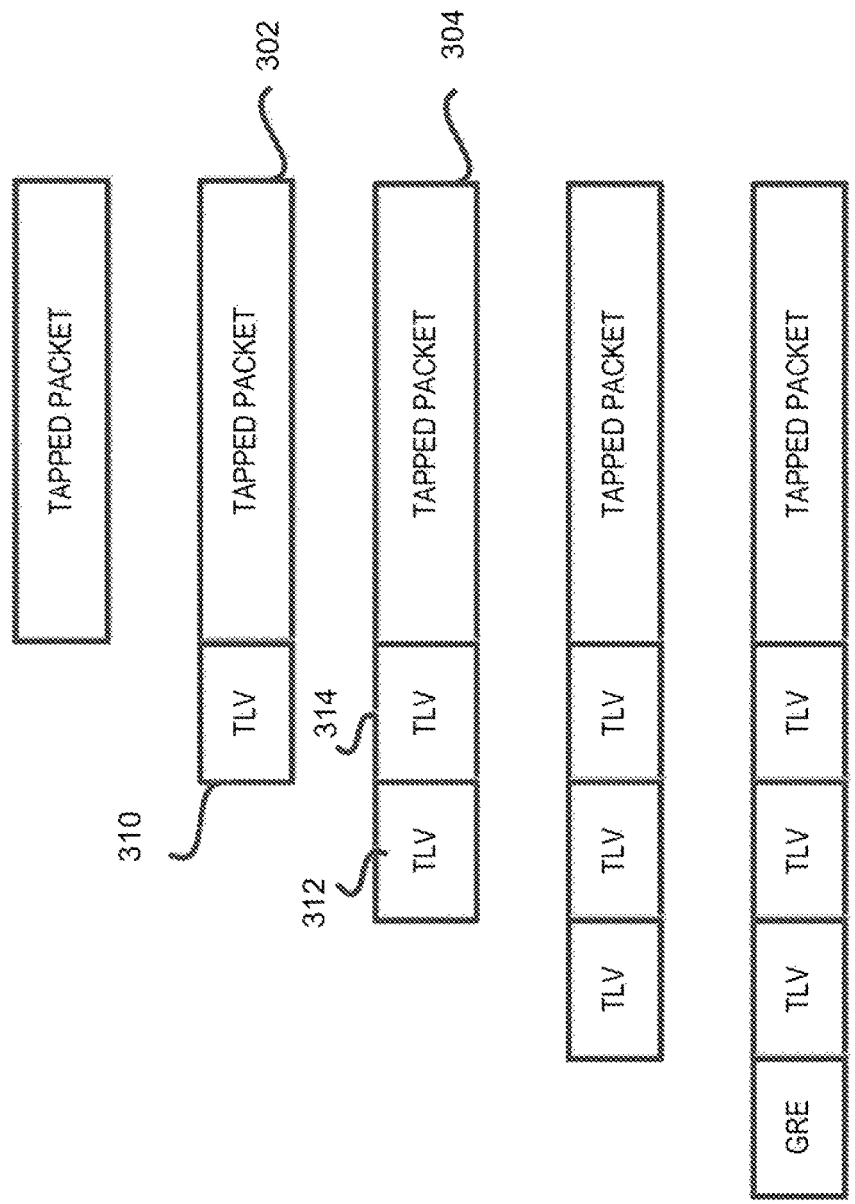
FIG. 3 shows, in an embodiment, an abstract representation of tap-generated metadata that may be attached to a data packet by a SmarTap arrangement.

FIG. 3 shows, in an embodiment, an abstract representation of the tap-generated metadata that may be attached to a data packet by a SmarTap arrangement. In an embodiment, tap-generated metadata may be composed of one or more attributes. For example, row 302 shows tap-generated metadata with one attribute (310), row 304 shows tap-generated metadata with two attributes (312 and 314), and so forth. As can be appreciated from the foregoing, the number of attributes that may be part of the tap-generated metadata may vary depending upon the needs of the monitoring tool.

Figure 4:
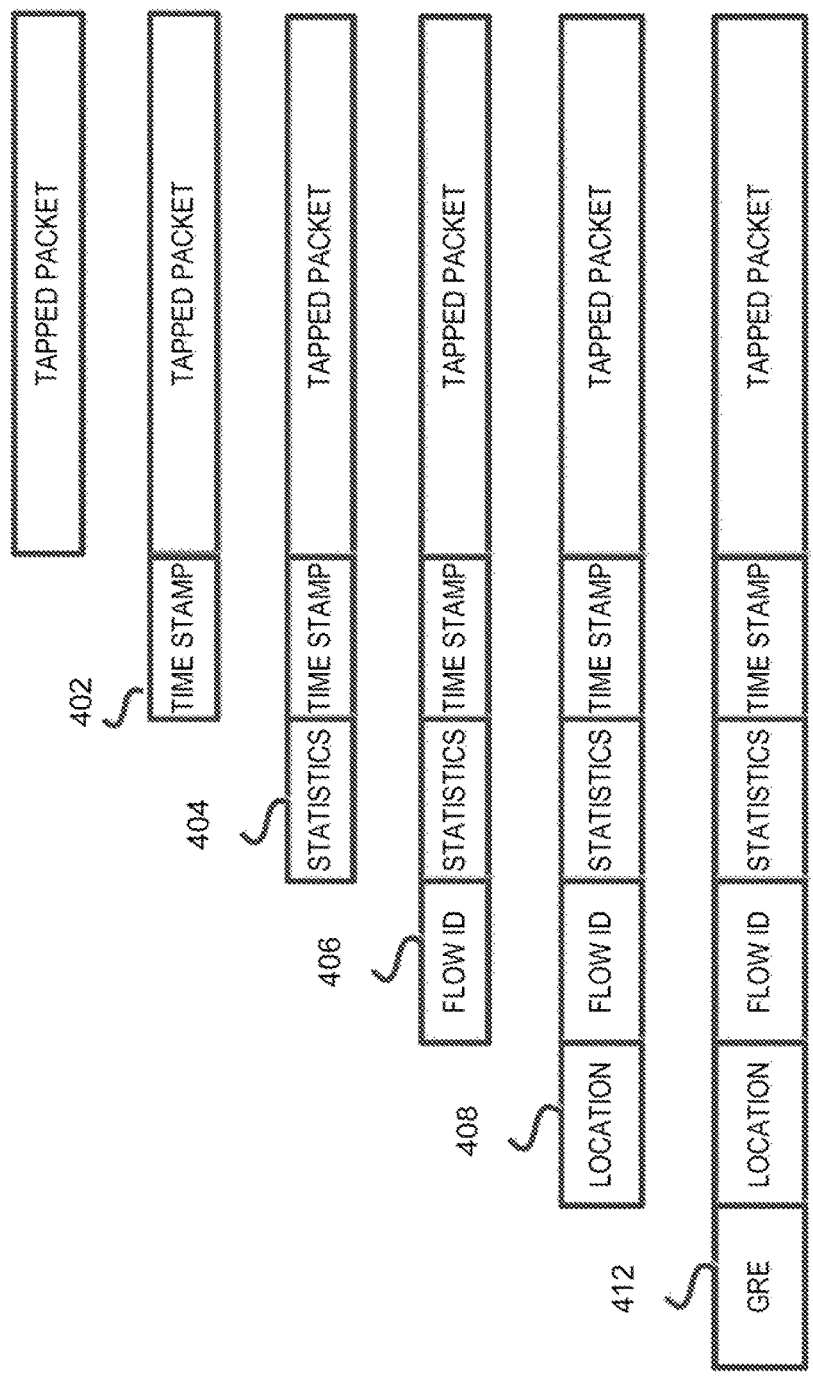
FIG. 4 shows, in an embodiment, an example of tap-generated metadata that may be attached to a data packet by a SmarTap arrangement.

With respect to FIG. 4, each attribute, in an embodiment, may be defined by its type, length and value. Examples of attributes may include, but are not limited to time stamp (402), statistics (404), flow-ID (406), and location (408). The time stamp may for example represent the time that the packet is received at a port of as network packet broker or device within which software and/or hardware implements the feature of adding metadata to the data packet. The location may, for example, represent the location where the metadata is added to the data packet.

In an embodiment, time stamp 402 may be included as an attribute of the tap-generated metadata. Time stamp 402 may refer to the time at which the data packet is captured by the SmarTap arrangement. Unlike the prior art, the time stamp is not a time estimate of when the data packet is captured but represents the actual time the data packet is intercepted by the SmarTap arrangement.

In an embodiment, the tap-generated metadata may also include statistics 404 as one of its attributes. Statistics 404 may include information related to the data packet, such as packet drop rate, packet flow rate, netflow standard, and the like. As can be appreciated by one skilled in the art, the types and number of statistics data items included may vary depending upon need.

Flow ID 406 may also be another attribute that may be included as an attribute of the tap-generated metadata. Flow ID 406 may refer to an identifier that may be employed to identify the data packet. For example, flow ID 406 may include source IP address, destination IP address, and other attributes that may uniquely identify the session.

Another important attribute that may be added to the tap-generated metadata is location 408, in an embodiment. Location 408 may refer to the coordinates of the data packet. In an embodiment, a GPS device (Global Positioning System device) may be connected to the network to provide grid reference. With the GPS, the exact location of the data packet may be deduced based on the grid coordinates provided. Another method of providing location 408 is with tap ID, which may be a unique identifier associated with each SmarTap arrangement. In another embodiment, the tap ID may be associated with the base station that is associated with the SmarTap arrangement. In another embodiment, the location may be deduced based on the received tunnel if the received tunnel is specifically associated with a specific SmarTap arrangement. Similarly, the location may be deduced based on the receive port if the SmarTap arrangement is associated with a specific receive port.

As can be appreciated from the foregoing, the tap-generated metadata that may be added to each data packet may be configurable. Referring back to the example in FIG. 2, SmarTap 228 may intercept a data packet traversing between network elements 208 and 210. Upon intercepting, the data packet, SmarTap 228 may create tap-generated metadata that meets the criteria as established by monitoring tool 242 (for example). Thus, depending upon the criteria established by monitoring tool 242, the tap-generated metadata may include one or more attributes. In an embodiment, a transportation protocol (such as generic routing encapsulation (GRE 412) protocol) may also be employed, to the transport and/or handle the data packet.

In an embodiment, the set of SmarTap arrangements may not be directly wired to a network packet broker 240. In the prior art, a network packet broker may deduce the identity of the tap that captures the packet based on the receive port identifier. For example, tap arrangement 128 is associated with receive port 1 (FIG. 1). Thus, based on the receive port identifier of the receive port 1, a network packet broker may be able to deduce that tap arrangement 128 is the tap that performs the tapping of the packet being received at receive port 1, and this tap location data (i.e., the received packet was tapped by tap arrangement 128) may be relayed to the monitoring tools for use in executing the monitoring tasks.

However with the SmarTap arrangement, the location data is no longer dependent upon the association in the network packet broker between a physical receive port and the tap device. Instead, the location data may be found within the tap-generated metadata that may be attached to the data packet. Advantageously, since the tap-generated metadata includes the necessary data required by the monitoring tools, each monitoring tool does not have to be physical connected to a network packet broker or even to a SmarTap arrangement to retrieve the data needed to analyze the network traffic. Instead, the monitoring tool may be connected to any network element (e.g., routers, switches, etc.) to receive the packets and to access the tap-generated metadata. As a result, the usage of tap-generated metadata and tunnel enables the SmarTap arrangements, monitoring tools, network packet brokers, and the like to be more broadly distributed, across the network with little or no geographic limitations.

In an embodiment, the SmarTap arrangement may include a logic arrangement that enables the SmarTap to manage the network traffic based on the type of data traversing the network. In an example, the type of data being forwarded and/or duplicated may be based on filtering conditions as defined by the monitoring tools. For example, data packets coming from a particular set of IP addresses may be forwarded to the monitoring tools. By filtering out data that may not be relevant, unnecessary drain on the network bandwidth may be minimized.

In another embodiment, the SmarTap arrangement may include a logic arrangement for managing the amount of data traffic flowing to the monitoring tools. In an example, the percentage of the network traffic being tapped may be based on a sampling threshold value. For example, only 60 percent of the network traffic may be tapped. In another example, the portion of the data packet being duplicated and forwarded to the monitoring tools may be based on pre-defined truncation criteria. For example, only the first 128 bits of the data packet may be forwarded for monitoring. In yet another example, the truncation of the data packet being monitored may be based on a predefined threshold (such as 256 bits, 500 bits, etc.). Thus, the ability to manage the amount of data flowing to the monitoring tools may further reduce the demands on the network resources (such as bandwidth).

Figure 5:
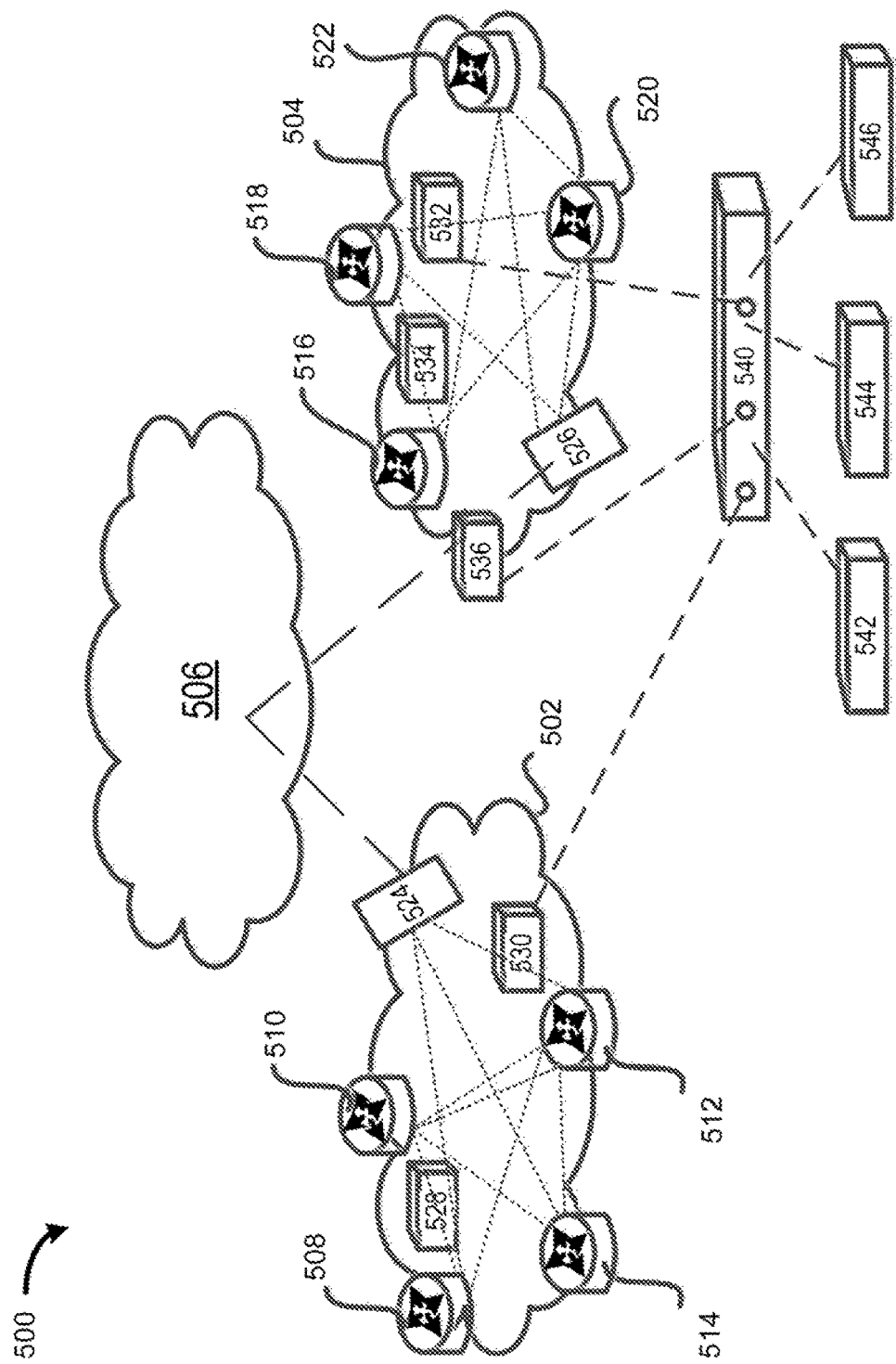
FIG. 5 shows, in an embodiment, implementation of a SmarTap arrangement within a layer 3 network.

Besides being implemented within a virtual environment, the SmarTap arrangement, in an embodiment, may also be implemented within a legacy hardwire environment 500 as shown in FIG. 5. Consider the situation wherein, for example, two layer 3 networks (502 and 504) may be interconnected via a network 506. The layer 3 networks may include a set of network elements (such as routers 508, 510, 512, 514, 516, 518, 520 and 522). Monitoring the network may include a set of tapping arrangements including legacy taps (530 and 532) and SmarTap arrangements (528, 534 and 536).

As previously mentioned, each SmarTap arrangement may forward data packets to monitoring tools (such as 542, 544 and 546) for analysis without being directly hardwired to the network packet broker (540). In other words, a monitoring tool is no longer required to be directly connected to a network packet broker and/or a tapping arrangement to retrieve the data packet and the relevant data stored in the tap-generated metadata of a data packet. Instead, the monitoring tool may be connected to any network element (such as a router or switch) to access the tap-generated metadata.

Alternatively or additionally, SmarTap arrangement (536) may be hardwired to network packet broker 540 and may direct network traffic through network packet broker 540 before being forwarded to the monitoring tools.

Generally speaking, the SmarTap arrangement may be implemented in various ways. For example, the SmarTap arrangement may be implemented as a separate hardware configured specifically for performing tapping. In another example, the SmarTap arrangement may be implemented as a hardware improvement (e.g., improved processor) within an existing hardware (such as a network packet broker). In another example, the SmarTap arrangement may be implemented as a software implementation within an existing network element (such as a network packet broker).

As can be appreciated from the foregoing, one or more embodiments of the present invention provides for arrangements and methods for performing monitoring capability across a virtual environment. With a SmarTap arrangement, monitoring tools may be connected to any network element and still be able to receive the relevant data for performing network analysis. Further, since the SmarTap arrangement is configurable, the drain on network bandwidth may be managed. In addition, given that the SmarTap arrangement may be implemented within existing hardwares, a company may benefit from a SmarTap arrangement without requiring an expensive overhaul.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims tithe term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. An arrangement comprising a network tap, the network tap comprising:
 a first port for receiving data packets from a network, wherein the data packets specify a destination address;
 logic communicatively coupled to said first port, said logic adding first metadata to each data packet of a first plurality of data packets comprising a percentage of said data packets from the network, thereby forming a first plurality of metadata-enhanced data packets, wherein said first metadata includes data specifying a geographic location of said arrangement, and wherein said geographic location is also a location where said first metadata is added to said first plurality of data packets, and wherein the data specifying the geographic location is distinct from a respective network address in each data packet of the first plurality of data packets;
 a second port for forwarding said first plurality of metadata-enhanced data packets from the network tap to a monitoring tool remote from the network tap, thereby enabling monitoring of the network by said monitoring tool remote from the
 network tap, wherein said first metadata comprises data employed by said monitoring tool remote from the network tap to perform network monitoring tasks; and
 a third port for forwarding the data packets on a path to the destination address.

2. The arrangement of claim 1 wherein said network is a virtual network environment.

3. The arrangement of claim 1 wherein said network is a mobile network environment.

4. The arrangement of claim 1 wherein said first metadata is generated in accordance with predefined requirements of said monitoring tool.

5. The arrangement of claim 1 wherein said first metadata includes a time-stamp reflecting a time said first data packet is received at said first port.

6. The arrangement of claim 1 wherein said first metadata includes a flow ID.

7. The arrangement of claim 1 wherein said first metadata-enhanced data packet represents a truncated version of said first data packet.

8. The arrangement of claim 1 wherein said first metadata is included in one or more fields of a header of said first data packet.

9. The arrangement of claim 1 wherein said logic is implemented as software in a network packet broker.

10. The arrangement of claim 1 wherein said first metadata is added to said first data packet only if a predefined threshold is met for a parameter of said data packets.

11. A method performed by a network tap, the method comprising: receiving data packets from a network, wherein the data packets specify a destination address; adding first metadata to a first data packet of said data packet and to each packet of a first plurality of data packets comprising a percentage of the data packets from the network, thereby forming a first plurality of metadata-enhanced data packets, wherein said first metadata includes data specifying a geographic location of said arrangement, and wherein said geographic location is also a location where said first metadata is added to said first data packet and a first plurality of packets, and wherein the data specifying the geographic location is distinct from a respective network address in the first data packet and each packet of the first plurality of data packets: forwarding said first metadata-enhanced data packet from the network tap to a monitoring tool remote from the network tap, thereby enabling monitoring of the network by said monitoring tool remote from the network tap, wherein said first metadata comprises data employed by said monitoring tool remote from the network tap to perform said network monitoring tasks; and forwarding the data packets on a path to the destination address.

12. The method of claim 11 wherein said network is a virtual network environment.

13. The method of claim 11 wherein said network is a mobile network environment.

14. The method of claim 11 wherein said first metadata includes a time-stamp reflecting a time said first data packet is received at said first port.

15. The method of claim 11 wherein said first metadata includes a flow ID.

16. The method of claim 11 wherein said first metadata is generated in accordance with predefined requirements of said monitoring tool.

17. The method of claim 11 wherein said first metadata-enhanced data packet represents a truncated version of said first data packet.

18. The method of claim 11 wherein said first metadata is included in one or more fields of a header of said first data packet.

19. The method of claim 11 wherein said receiving, adding, and forwarding are implemented by software in a network packet broker.

20. The arrangement of claim 1 wherein the network is implemented using a virtual environment and network data packets flow through abstract representations of physical hardware, and wherein the data specifying the geographic location of the arrangement comprises global positioning system (GPS) grid coordinates.

* * * * *